(12) United States Patent
Yang et al.

(10) Patent No.: US 6,725,315 B2
(45) Date of Patent: Apr. 20, 2004

(54) SYSTEM AND METHOD TO EFFICIENTLY MOVE DATA FROM ONE DATA BUS TO ANOTHER DATA BUS IN A NETWORK SWITCH

(75) Inventors: Changyong Yang, San Jose, CA (US); Paul B. Moore, Woodside, CA (US)

(73) Assignee: Nortel Networks Limited, St. Laurent (CA)

( * ) Notice: Subject to any disclaimer, the term of this patent is extended or adjusted under 35 U.S.C. 154(b) by 475 days.

(21) Appl. No.: 09/747,239

(22) Filed: Dec. 22, 2000

(65) Prior Publication Data

US 2002/0080803 A1 Jun. 27, 2002

(51) Int. Cl.$^7$ .......................... G06F 13/36; G06F 12/00
(52) U.S. Cl. .................. 710/306; 710/310; 710/315; 711/147; 711/111; 711/138; 711/154
(58) Field of Search ................... 710/306, 310, 710/315; 711/147, 111, 138, 154; 370/351, 412, 911

(56) References Cited

U.S. PATENT DOCUMENTS

| 5,903,908 A | | 5/1999 | Singh et al. | |
|---|---|---|---|---|
| 6,098,110 A | * | 8/2000 | Witkowski et al. | ......... 710/310 |
| 6,356,984 B1 | * | 3/2002 | Day et al. | ................... 711/147 |

FOREIGN PATENT DOCUMENTS

| EP | 0 594 025 | 4/1994 |
|---|---|---|
| EP | 0 905 629 | 3/1999 |
| WO | WO 00/56024 | 9/2000 |

* cited by examiner

Primary Examiner—Khanh Dang
(74) Attorney, Agent, or Firm—Blakely Sokoloff Taylor & Zafman LLP

(57) ABSTRACT

The present invention relates to a system and method to efficiently move data from one data bus to another data bus in a network switch. The method includes generating a packet cycle on a first data bus. The method also includes generating a control data cycle on a second data bus. The method further includes processing the packet cycle on the first data bus after processing the control data cycle on the second data bus.

21 Claims, 5 Drawing Sheets

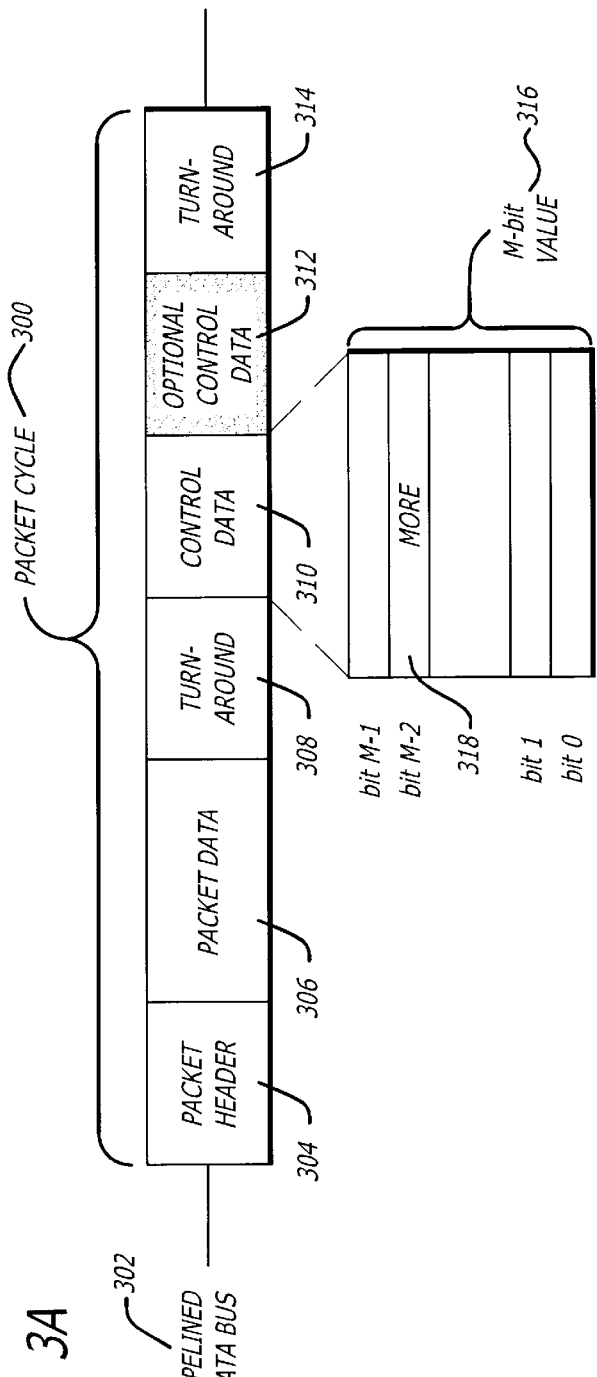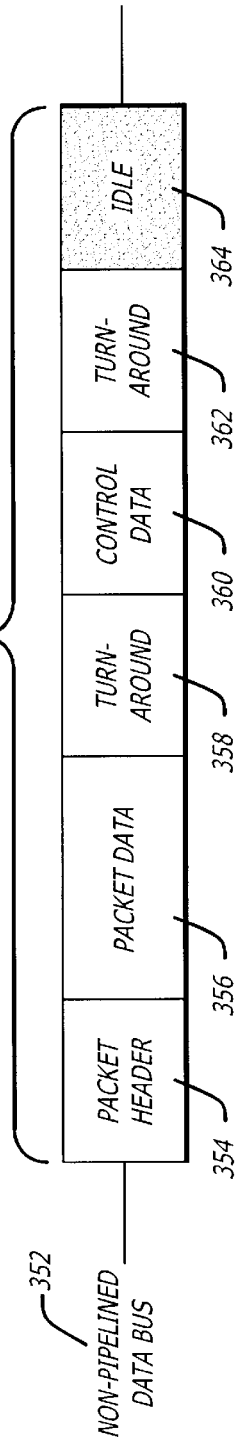

SYSTEM AND METHOD TO EFFICIENTLY MOVE DATA FROM ONE DATA BUS TO ANOTHER DATA BUS IN A NETWORK SWITCH

BACKGROUND (1) Field

This invention relates to a system and method to efficiently move data from one data bus to another data bus in a network switch.

(2) General Background

Network switches and routers are prevalently employed in data networks to forward data packets in these networks. The data networks should operate as efficiently as possible to support as many users as possible since a higher user volume would result in more generated revenues. As a result, network switches and routers should process data packets as efficient and as fast as possible.

SUMMARY OF THE INVENTION

The present invention relates to a system and method to efficiently move data from one data bus to another data bus in a network switch. The method includes generating a packet cycle on a first data bus. The method also includes generating a control data cycle on a second data bus. The method further includes processing the packet cycle on the first data bus after processing the control data cycle on the second data bus.

The control data cycle on the second data bus is used to initiate or prompt the processing of the packet cycle on the first data bus before the packet cycle is completely placed on the first data bus. As a result, data on the first data bus is generally processed more quickly and efficiently.

Other aspects and features of the present invention will be come apparent to those ordinarily skilled in the art upon review of the following description of specific embodiments of the invention in conjunction with the accompanying claims and figures.

BRIEF DESCRIPTION OF THE DRAWINGS

FIG. 3A is an exemplary timing diagram illustrating a packet cycle that is generated and placed on pipelined data bus;

FIG. 3B is an exemplary timing diagram illustrating a packet cycle that is generated and placed on non-pipelined data bus;

DETAILED DESCRIPTION

The present invention relates to a system and method to efficiently move data from one data bus to another data bus in a network switch.

Figure 1:
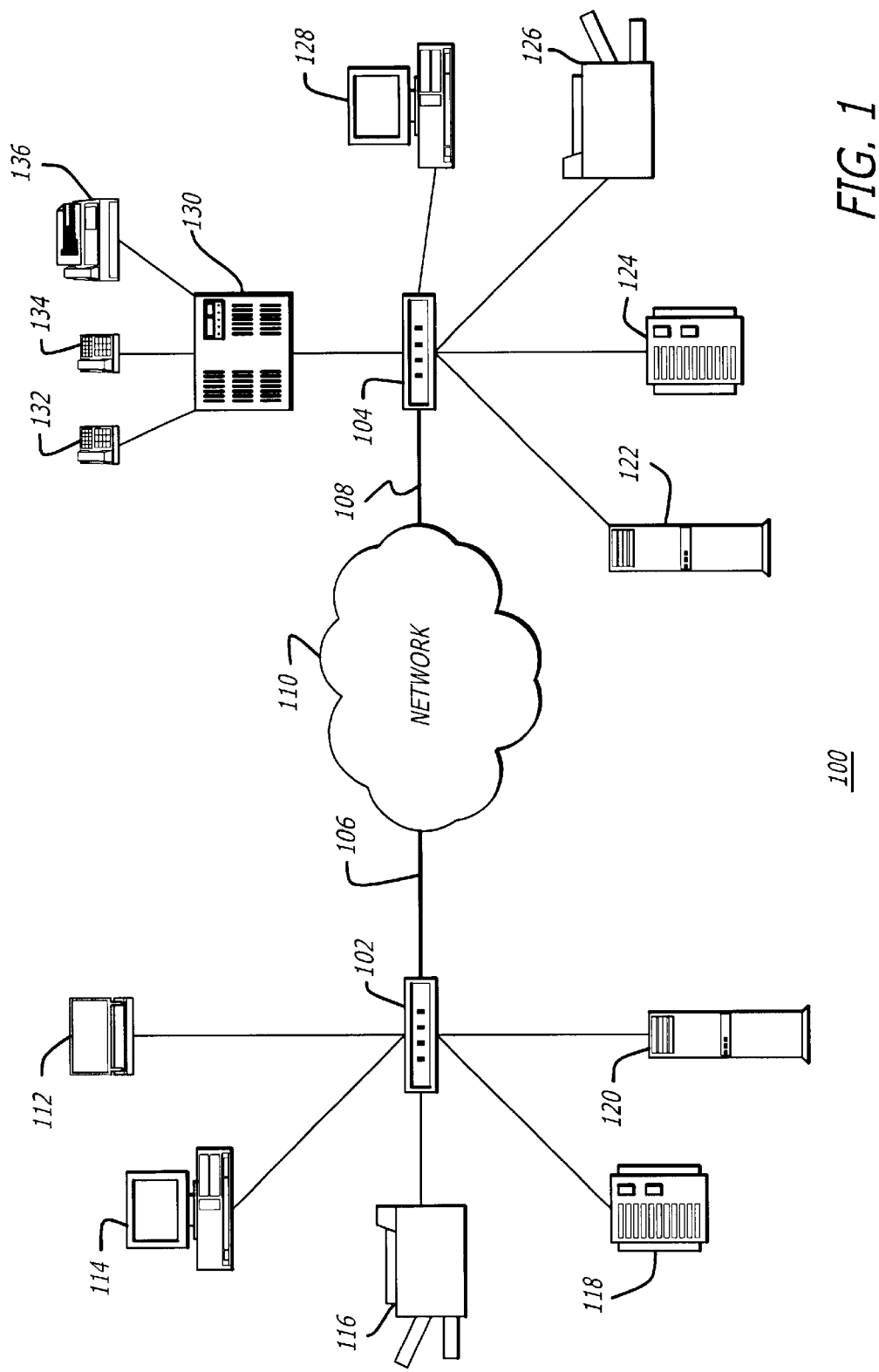
FIG. 1 is an exemplary diagram of a system in accordance with one embodiment of the present invention.

FIG. 1 is an exemplary diagram of a system 100 in accordance with one embodiment of the present invention. The system 100 includes network switches or routers 102, 104 that are operatively coupled together by network links 106, 108 and network 110.

Network switch or router 102 is coupled to a plurality of network devices 112, 114, 116, 118, 120. Network devices are generally computing devices having networking capability. As illustrated in FIG. 1, examples of network devices can include a laptop computer 112, a desktop computer 114, a network printer 116, a network storage device 118, and a server 120. In practice, a network device can be a set-top-box, a hand-held device, or any computing devices with networking capability.

Network switch or router 104 is coupled to a plurality of network devices, including a server 122, a network storage device 124, a network printer 126, and a desktop 128. Network switch or router is also coupled to a private branch exchange (PBX) system 130. PBX system 130 is coupled to telephones 132, 134 and fax machine 136.

Figure 2:
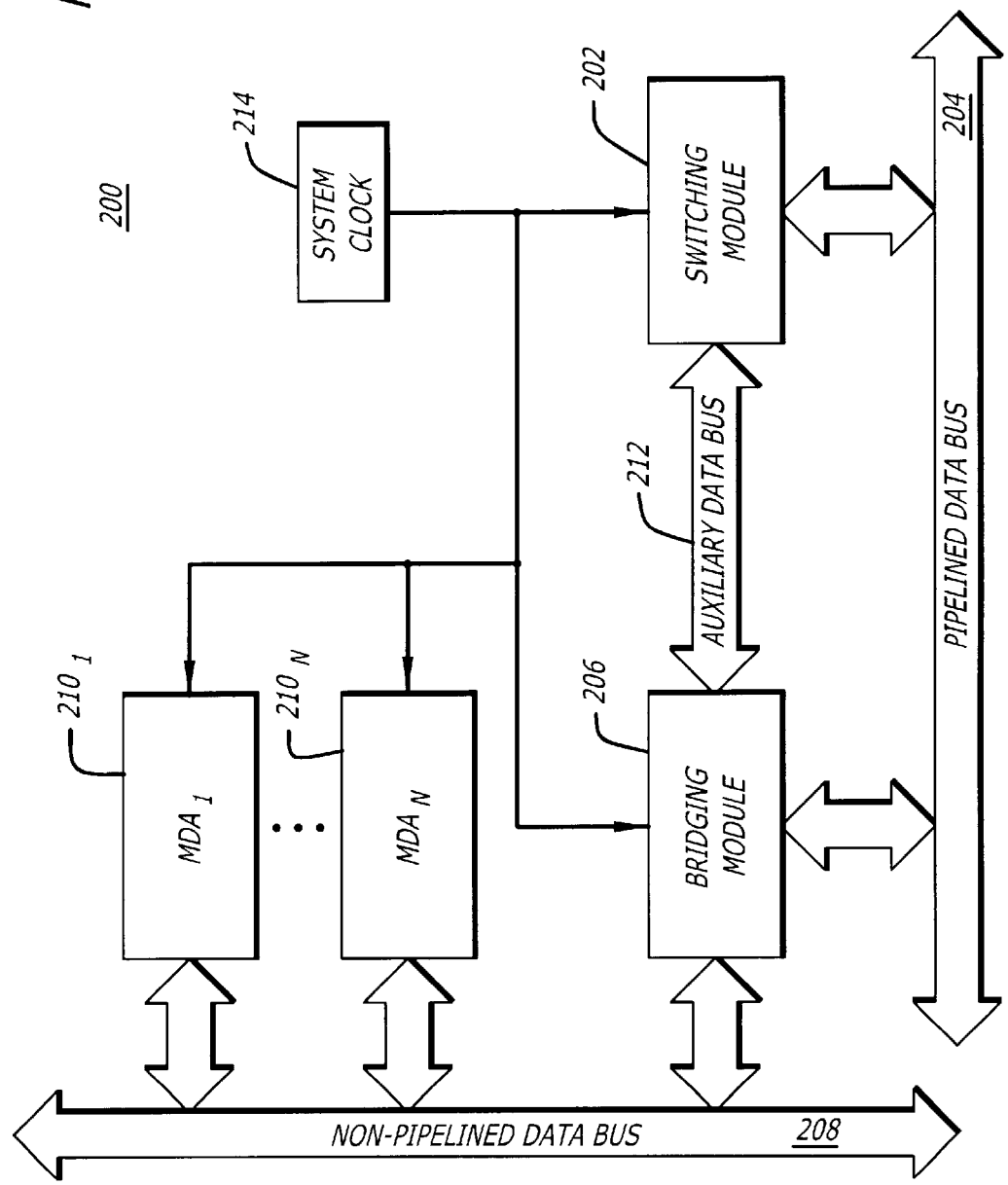
FIG. 2 is an exemplary block diagram of a network switch or router in accordance with one embodiment of the present invention.

FIG. 2 is an exemplary block diagram of a network switch or router 200 (also shown in FIG. 1) in accordance with one embodiment of the present invention. Network switch or router 200 includes switching module 202. In one embodiment, switching module 202 is a chipset that generally provides information required to switch or forward data packets to appropriate destinations.

To switch or forward data packets, switching module 200 generally puts the packets on pipelined data bus 204. In one embodiment, pipelined data bus 204 is a 64-bit bus clocked at 40 MHz, providing a maximum data bandwidth of 2.56 Gbps. A more detail description of the operational cycles of pipelined data bus 204 will be provided below in FIG. 3A and the text describing the figure.

Network switch or router 200 also includes bridging module 206. In one embodiment, bridging module 206 is a chipset that generally retrieves data packets available on pipelined data bus 204, processes these packets, and places the packets on non-pipelined data bus 208 for media dependent adapters $210_1, \ldots, 210_N$ ($MDA_1$ to $MDA_N$ where "N" is a positive integer) to process.

Media dependent adapters $210_1, \ldots, 210_N$ generally provide communication ports to establish linkage to different types of physical media external to network switch or router, including Asynchronous Transfer Mode (ATM), Ethernet (10/100 Mbps), Gigabit Ethernet, Shortwave Gigabit Fiber, Longwave Gigabit Fiber, and the like.

Each MDA $210_1, \ldots 210_N$ monitors non-pipelined data bus 208 for packets addressed to the MDA $210_1, \ldots, 210_N$. If an MDA $210_1, \ldots, 210_N$ finds packets addressed to it, the MDA $210_1, \ldots, 210_N$ retrieves the packets from non-pipelined data bus 208 and processes them.

Switching module 202 also sends data over auxiliary data bus 212 to bridging module 206. The data that switching module 202 sends over auxiliary data bus 212 is generally control data to instruct bridging module 206 as how bridging module 206 should process data on pipelined data bus 204.

Switching module 202 sends control data over auxiliary data bus 212 to bridging module 206 to generally prompt bridging module 206 to process packet data, resulting in faster processing of packet data. Additional details regarding the content of data sent over auxiliary data bus will be provided below in FIG. 4 and the text describing the figure.

Network switch or router 200 further includes a system clock 214 that is operatively connected to switching module 202, bridging module 206, and media dependent adapters 210$_1$, . . . , 210$_N$. System clock 214 generally provides time cycles periods with equal duration when modules 202, 206, 210$_1$, . . . , 210$_N$ in network switch or router 200 can access the data buses 204, 208, 212.

FIG. 3A is an exemplary timing diagram illustrating a packet cycle 300 that is generated and placed on pipelined data bus 302. It should be noted that pipelined data bus 302 is generally equivalent to bus 204 in FIG. 2.

In general, one packet cycle 300 needs to be generated to transmit one data packet. Each packet cycle 300 includes the following operational cycles: packet header cycle 304, packet data cycle 306, turnaround cycle 308, control data cycle 310, optional control data cycle 312, and turnaround cycle 314.

Each packet cycle 300 includes one packet header cycle 304. Packet header cycle 304 occurs on pipelined data bus 302 before packet data cycle 306. In each packet header cycle 304, information needed to process a packet is transmitted. For example, information transmitted during a packet header cycle 304 can include a virtual local area network identifier (VID), priority bits as specified by IEEE Standard 802.1p, the source port, the length of packet data, and error bits. In one embodiment where pipelined data bus is a 64-bit bus, packet header cycle 304 is used to transmit a 64-bit value, and therefore occupies pipelined data bus 302 for one system clock cycle.

Each packet cycle 300 also includes one packet data cycle 306. In one embodiment, one Ethernet packet is transmitted in each packet data cycle 306. An Ethernet packet can be between 64 and 1522 bytes in length. If the length of the Ethernet packet is not evenly divisible by eight, the packet will be appropriately padded prior to being placed on pipelined data bus 302. In an embodiment where pipelined data bus 302 is 64-bit wide, each packet data cycle 306 can occupy pipelined data bus 302 for eight (8) to two hundred twenty three (223) system clock cycles to transmit one Ethernet packet.

Each packet cycle 300 on pipelined data bus 302 further includes turnaround cycles 308, 314. Each turnaround cycle 308, 314 generally offers the contention-free opportunity for one device attached to pipelined data bus 302 to stop driving the data bus 302, and allows another device attached to the data bus 302 to drive the data bus 302.

The first turnaround cycle 308 occurs between packet data cycle 306 and control data cycle 310. During the first turnaround cycle 308, bridging module 206 (shown in FIG. 2) turns off its circuitry that drives pipelined data bus 302, while switching module 202 (also shown in FIG. 2) turns on its circuitry that drives pipelined data bus 302.

The second turnaround cycle 314 occurs after control data cycle 310, and also after optional data cycle 312, if present. During the second turnaround cycle 314, switching module 202 (shown in FIG. 2) turns off its circuitry that drives pipelined data bus 302, while bridging module 206 (also shown in FIG. 2) turns on its circuitry that drives pipelined data bus 302.

In one embodiment, each turnaround cycle 308, 314 is used to transmit a 64-bit value. In this embodiment, each turnaround cycle 308, 314 would occupy a pipelined data bus 302 that is 64-bit wide for one system clock cycle.

Control data cycle 310 is the first cycle in which control data is placed on pipelined data bus 302 for transmission. Control data cycle 310 is general used to transmit an M-bit (where "M" is a positive integer) value 316, containing packet-forwarding information, e.g., egress ports, flooding, filtering and sniffing bits, or the like.

In one embodiment, control data cycle 310 is used to transmit a 64-bit value. In this embodiment, control data cycle 310 would occupy a pipelined data bus 302 that is 64-bit wide for one system clock cycle.

A "MORE" bit 318 is included in the M-bit value 316 transmitted during control data cycle 310 to indicate whether an optional control data cycle 312 will follow the control data cycle 310. In the embodiment where a 64-bit value is transmitted during the control data cycle 310 and where bit 0 is the least significant bit and bit 63 is the most significant bit of the 64-bit value, the "MORE" bit 318 would be bit 62 of the 64-bit value.

In one embodiment, a value of one (1) in the "MORE" bit 318 would specify that there will be an optional control data cycle 312 following the control data cycle 310. In this embodiment, a value of zero (0) in the "MORE" bit 318 would specify that there will not be an optional control cycle 312 following the control data cycle 310.

Optional control data cycle 312 is generally used to transmit packet modification commands and data fields. In one embodiment, a 64-bit value is transmitted in the optional control data cycle 312. In this embodiment, optional control data cycle 312 would occupy a pipelined data bus that is 64-bit wide for one system clock cycle.

FIG. 3B is an exemplary timing diagram illustrating a packet cycle 350 that is generated and placed on non-pipelined data bus 352. It should be noted that pipelined data bus 352 is generally equivalent to bus 208 in FIG. 2

In general, one packet cycle 350 needs to be placed on non-pipelined data bus 352 to transmit one packet. Each packet cycle 350 includes the following operational cycles: packet header cycle 354, packet data cycle 356, turnaround cycle 358, control data cycle 360, turnaround cycle 362, and idle cycle 364 (which is optional).

As shown in FIG. 2 and described in the text accompanying the figure, bridging module 206 generally retrieves data available on pipelined data bus 204, processes the data, and places the data on non-pipelined data bus 208 for media dependent adapters 210$_1$, . . . , 210$_N$ to process.

In examining FIG. 3B in conjunction with FIG. 3A, data transmitted during the packet cycles 350 of non-pipelined data bus 352 is generally similar to data transmitted during the packet cycles 300 of pipelined data bus 302. However, a packet cycle 350 on non-pipelined data bus 352 does not include an optional control data cycle. For each optional control data cycle 300 generated on pipelined data bus 302, an idle cycle 364 will be generated and placed on non-pipelined data bus 352 after the second turnaround cycle 362. An idle cycle 364 on non-pipelined data bus 352 is generally a time period during which none of the devices attached to the data bus 352 is driving the data bus 352.

As stated above, an M-bit value 316 is generated and transmitted during the control data cycle 310 on pipelined data bus 302. The M-bit value 316 contains a "MORE" bit 318 to indicate whether an optional control data cycle 312 will follow the control data cycle 310 on pipelined data bus 302.

The M-bit value 316 transmitted during the control data cycle 310 on pipelined data bus 302 will generally be duplicated and transmitted during the control data cycle 360 on non-pipelined data bus 352. However, the MORE bit 318 included in the M-bit value 316 has no significance on non-pipelined data bus 352, since a packet cycle 350 on non-pipelined data bus 352 does not include an optional control data cycle.

Figure 4:
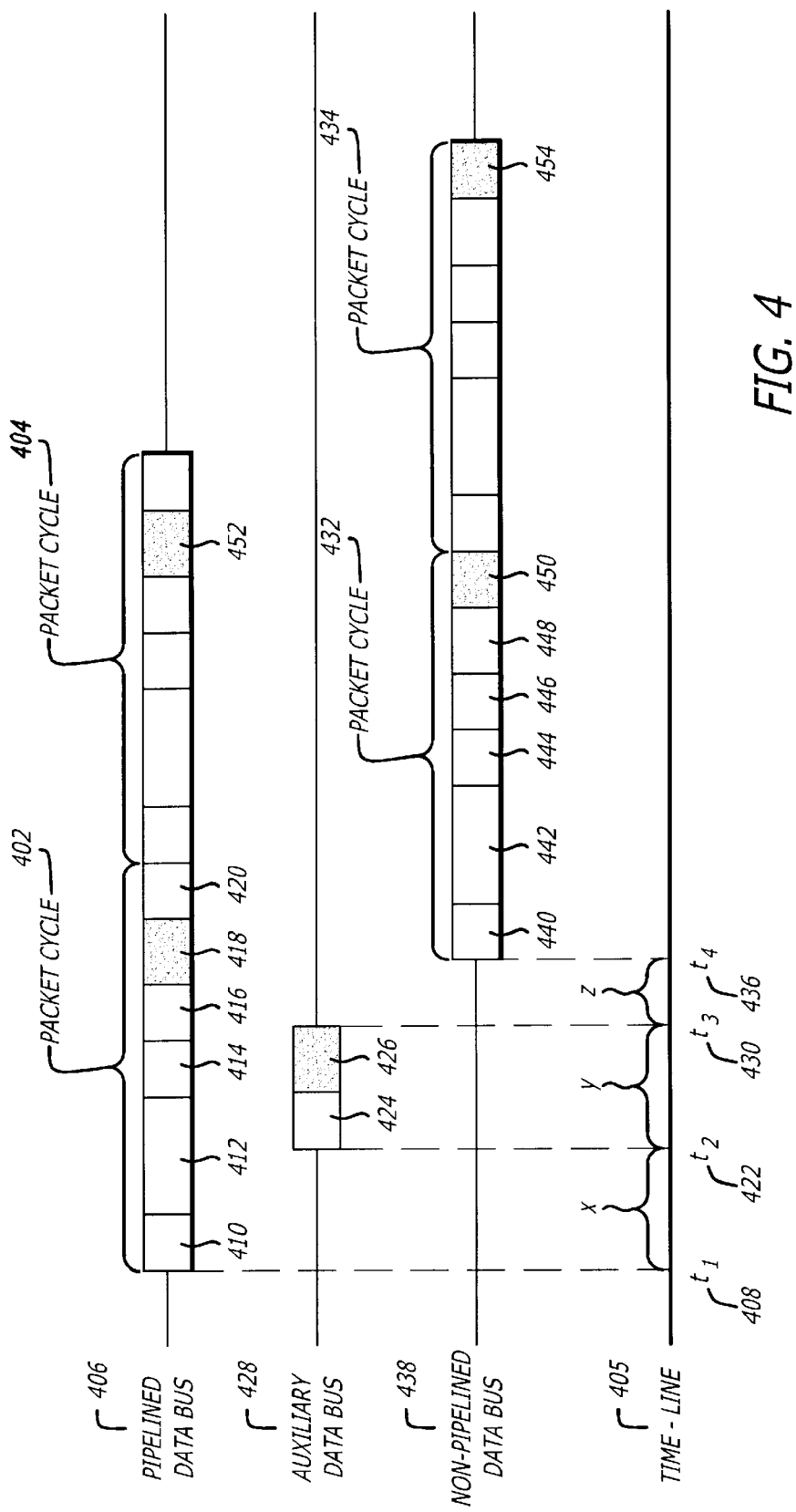
FIG. 4 is an exemplary timing diagram showing operational cycles generated and placed at certain time periods on pipelined data bus, auxiliary data bus, and non-pipelined data bus.

FIG. 4 is an exemplary timing diagram showing operational cycles generated and placed at certain time periods on pipelined data bus 406, auxiliary data bus 428, and non-pipelined data bus 438. Pipelined data bus 406 is generally equivalent to bus 204 in FIG. 2 and bus 302 in FIG. 3A; auxiliary data bus 428 is generally equivalent to bus 212 in FIG. 2; and non-pipelined data bus 438 is generally equivalent to bus 208 in FIG. 2 and bus 352 in FIG. 3B.

It should be noted that $t_P$ (where "P" is a positive integer) is used in the timing diagram of FIG. 4 to denote points on the time-line 405.

The diagram shows two packet cycles 402, 404 that are generated and placed on pipelined data bus 406. At time $t_1$ 408, switching module begins to generate and place operational cycles 410, 412, 414, 416, 418, 420 for the first packet cycle 402 on pipelined data bus.

At time $t_2$ 422 after "X" system clock cycles following time $t_1$, switching module begins placing control data cycle 424 and optional control data cycle 426 (if needed) on auxiliary data bus 428. In one embodiment, the difference between time $t_2$ 422 and time $t_1$ 408 or X is thirty-four (34) system clock cycles.

It should be noted that data transmitted during control data cycle 424 and optional control data cycle 426 on auxiliary data bus 428 is identical to data transmitted during control data cycle 416 and optional control data cycle 418 of the first packet cycle 402 on pipelined data bus 406.

At time $t_3$ 430 after "Y" system clock cycles following time $t_2$ 422, switching module finishes placing control data cycle 424 and optional control data cycle 426 (if needed) on auxiliary data bus 428. In one embodiment, control data cycle 424 is used to transmit a 64-bit value, optional data cycle 426 is used to transmit a 64-bit value, and auxiliary data bus 428 is a 16-bit wide data bus. In this embodiment, Y is eight (8) system clock cycles. In other words, control data cycle 424 and optional control data cycle 426 collectively occupy auxiliary data bus 428 for eight (8) system clock cycles.

The diagram of FIG. 4 shows two packet cycles 430, 432 on non-pipelined data bus 434. Packet cycles 432, 434 on non-pipelined data bus 436 corresponds to packet cycles 402, 404 on pipelined data bus 406.

At time $t_4$ 436 after "Z" system clock cycles following time $t_3$ 430, bridging module begins generating operational cycles 440, 442, 444, 446, 448, 450 for the first packet cycle 432 on non-pipelined data bus 436. Before generating the first packet cycle on non-pipelined data bus 436, bridging module needs Z system clock cycles to examine control data sent collectively during control data cycle 424 and optional data cycle (if needed) 426 on auxiliary data bus 428. In one embodiment, Z or the time that bridging module needed to examine control data sent over auxiliary data bus 428 is six (6) system clock cycles.

It should be noted that optional control data cycles 418, 452 on pipelined data bus 406 are replaced by idle cycles 450, 454 on non-pipelined data bus 438 since packet cycles 432, 434 do not include optional control data cycles.

By generating and placing control data cycle 424 and optional control data cycle (if needed) 426 on auxiliary data bus 428, switching module prompts bridging module to process packet cycles 402, 404 on pipelined data bus 406 before switching module finishes generating these packet cycles 402, 404. As a result, data on pipelined data bus 406 are processed with minimal latency. Furthermore, bridging module does not have to cache or store data that bridging module retrieves from pipelined data bus 406. As a result, the functional complexity of the bridging module is reduced.

Figure 5:
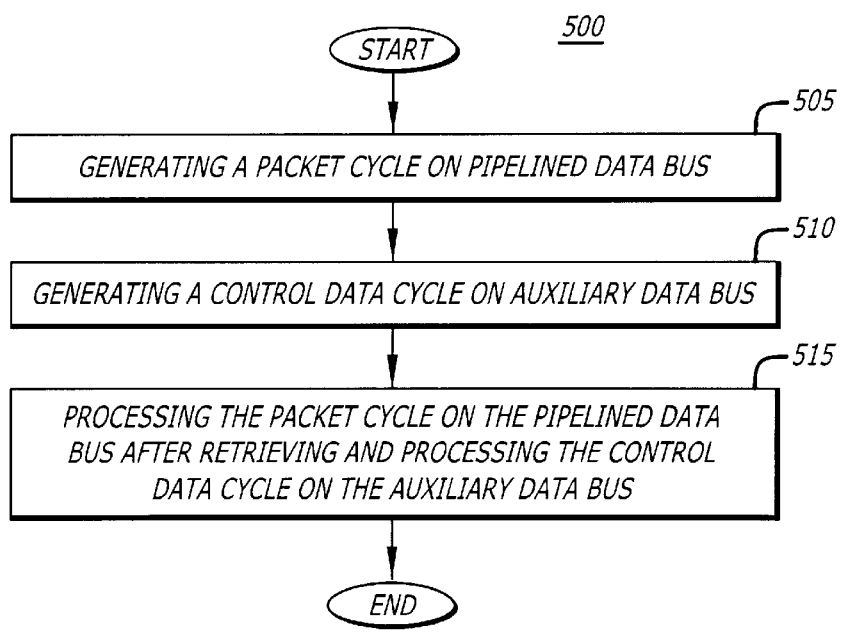
FIG. 5 is an exemplary flow chart outlining a process 500 of generating a control data cycle on the auxiliary data bus to prompt processing of data on the pipelined data bus.

FIG. 5 is an exemplary flow chart outlining a process 500 of generating a control data cycle on the auxiliary data bus to prompt processing of data on the pipelined data bus. In block 505, a packet cycle is generated and placed on the pipelined data bus.

As shown in FIG. 3A and the text describing the figure, each packet cycle 300 includes a control data cycle 310, which generally contains packet-forwarding information. Examples of packet-forwarding information can include egress port identifiers, flooding bits, filtering bits, or sniffing bits.

In block 510 of FIG. 5, a control data cycle is generated and placed on the auxiliary data bus. After the control data cycle on the auxiliary data bus is retrieved and processed, the packet cycle on the pipelined data bus will be retrieved and processed (block 515).

Figure 6:
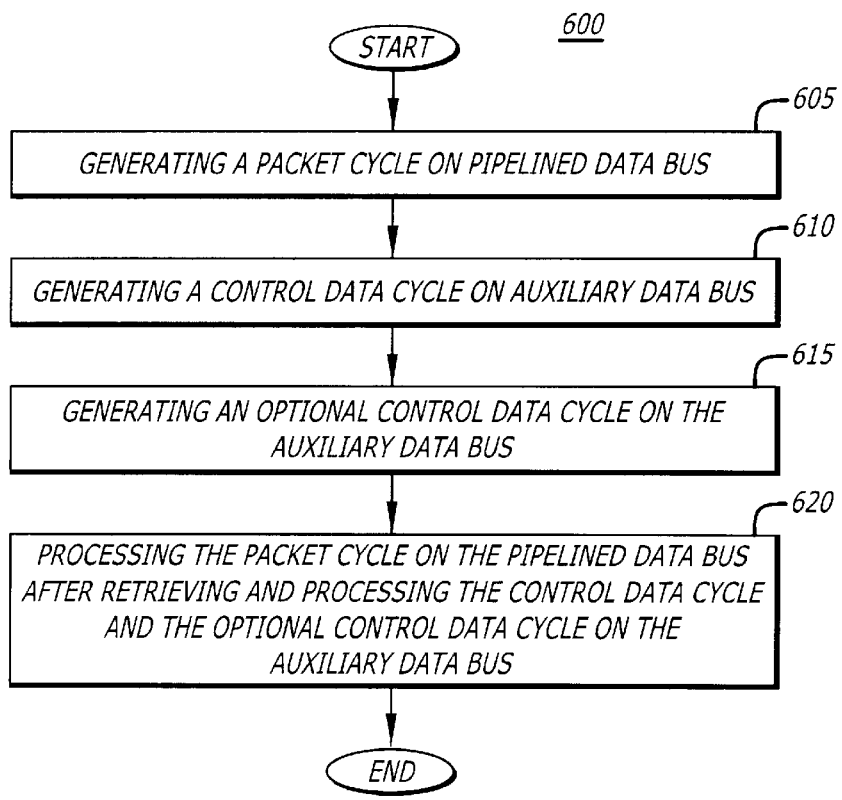
FIG. 6 is an exemplary flow chart outlining a process of generating a control data cycle and an optional control data cycle on the auxiliary data bus to prompt processing of data on the pipelined data bus.

FIG. 6 is an exemplary flow chart outlining a process 600 of generating a control data cycle and an optional control data cycle on the auxiliary data bus to prompt processing of data on the pipelined data bus. In block 605, a packet cycle is generated and placed on the pipelined data bus.

As shown in FIG. 3A and the text describing the figure, each packet cycle 300 includes a control data cycle 310 and an optional control data cycle 312. The control data cycle 310 generally contains packet-forwarding information such as egress ports, flooding, filtering, and sniffing bits or the like. The optional control data cycle 312 generally contains packet modification commands and data fields.

In block 610 of FIG. 6, a control data cycle is generated and placed on the auxiliary data bus. In block 615, an optional control data cycle is also generated and placed on the auxiliary data bus. After the control data cycle and the optional control data cycle on the auxiliary data bus are retrieved and processed, the packet cycle on the pipelined data bus will be retrieved and processed (block 620).

While certain exemplary embodiments have been described and shown in accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

In addition it is possible to implement the present invention or some of its features in hardware, firmware, software or a combination thereof where the software is provided in a machine readable storage medium such as a magnetic, optical, or a semiconductor storage medium. If the present invention or some of its features is implemented in firmware or software code segments, each of the code segments would include one or more programming instructions.

What is claimed is:

1. A network switch, comprising:
   a switching module operatively coupled to a pipelined data bus and an auxiliary data bus;
   the switching module generates and places a first packet cycle on the pipelined data bus, the first packet cycle includes a first control data cycle to transmit packet-forwarding information;
   the switching module generates and places a second control data cycle on the auxiliary data bus before the first control data cycle is placed on the pipelined data bus, the second control data cycle prompts the bridging module to process the first packet cycle with minimal latency;
   a bridging module operatively coupled to the pipelined data bus and the auxiliary data bus, the bridging module processes the first packet cycle on the pipelined data bus after processing the second control data cycle on the auxiliary data bus; and, a non-pipelined data bus operatively coupled to the switching module and the bridging module, the bridging module generates and places a second packet cycle on the non-pipelined data bus using data transmitted in the first packet cycle on the pipelined data bus.

2. The switch of claim 1, wherein the second control data cycle on the auxiliary data bus is used to transmit packet-forwarding information including at least one of egress ports, flooding bits, filtering bits, and sniffing bits.

3. The switch of claim 1, wherein the second control data cycle on the auxiliary data bus includes a bit specifying whether a third control data cycle on the auxiliary data bus will follow the second control data cycle.

4. The switch of claim 1, wherein the switching module generates and places a third control data cycle on the auxiliary data bus.

5. The switch of claim 4, wherein the third control data cycle is used to transmit packet modification commands and data fields.

6. The switch of claim 4, wherein the bridging module processes the first packet cycle on the pipelined data bus after processing the second control data cycle and the third control data cycle on the auxiliary data bus.

7. The switch of claim 1, wherein the first packet cycle further includes a fourth control data cycle, and wherein the bridging module generates an idle cycle in the second packet cycle on the non-pipelined data bus for the fourth control data cycle found in the first packet cycle on the pipelined data bus.

8. A network switch, comprising:

a switching module to generate and place a first packet cycle on the first data bus and a first control data cycle on the second data bus;

a bridging module operatively coupled to the first data bus and the second data bus, the bridging module processes the packet cycle on the first data bus after processing the first control data cycle on the second data bus; and, a third data bus operatively coupled to the switching module and the bridging module, the bridging module generates and places a second packet cycle on the third data bus using data transmitted in the first packet cycle on the first data bus.

9. The switch of claim 8, wherein the switching module is operatively coupled to the first data bus, and the first data bus is a pipelined data bus.

10. The switch of claim 8, wherein the switching module is operatively coupled to the second data bus, and the second data bus is an auxiliary data bus.

11. The switch of claim 8, wherein the first control data cycle on the second data bus is used to transmit packet-forwarding information.

12. The switch of claim 8, wherein the first control data cycle on the second data bus includes a bit specifying that an second control data cycle will follow the first control data cycle on the second data bus.

13. The switch of claim 8, wherein the switching module generates and places an second control data cycle on the second data bus following the first control data cycle.

14. The switch of claim 13, wherein the second control data cycle on the second data bus is used to transmit packet modification commands and data fields.

15. The switch of claim 13, wherein the bridging module processes the first packet cycle on the first data bus after processing the first control data cycle and the second control data cycle on the second data bus.

16. The switch of claim 8, wherein the first packet cycle further includes a fourth control data cycle and a fourth control data cycle, and wherein the bridging module generates an idle cycle in the second packet cycle on the third data bus for each fourth control data cycle found in the first packet cycle on the first data bus.

17. A method to switch packets, comprising:

generating a first packet cycle on a first data bus;

generating a first control data cycle on a second data bus;

processing the first packet cycle on the first data bus after processing the first control data cycle on the second data bus; and, generating and placing a second packet cycle on a third data bus using the packet cycle on the first data bus.

18. The method of claim 17, further comprising:

using a bit in the first control data cycle on the second data bus to specify whether there will be an second control data cycle on the second data bus following the first control data cycle.

19. The method of claim 17, further comprising:

generating and placing an second control data cycle on the second data bus following the first control data cycle on the second data bus.

20. The method of claim 17, further comprising:

processing the first packet cycle on the first data bus after processing the first control data cycle and the second control data cycle on the second data bus.

21. The method of claim 17, wherein generating and placing the second packet cycle on the third data bus includes generating an idle cycle in the second packet cycle on the third data bus for a second control data cycle found in the packet cycle on the first data bus.

* * * * *